United States Patent
Bar-Ziv et al.

(10) Patent No.: US 9,193,916 B2
(45) Date of Patent: Nov. 24, 2015

(54) TORREFACTION APPARATUS AND PROCESS

(75) Inventors: Ezra Bar-Ziv, Atlantic Mine, MI (US); Roman Saveliev, Beer-Sheva (IL); Miron Perelman, Beer-Sheva (IL)

(73) Assignee: EB CLEAN ENERGY LTD., Beer-Shiva (IL)

( * ) Notice: Subject to any disclaimer, the term of this patent is extended or adjusted under 35 U.S.C. 154(b) by 585 days.

(21) Appl. No.: 13/594,235

(22) Filed: Aug. 24, 2012

(65) Prior Publication Data

US 2014/0053458 A1 Feb. 27, 2014

(51) Int. Cl.
| | |
|---|---|
| *C10B 53/02* | (2006.01) |
| *C10B 47/44* | (2006.01) |
| *C10B 57/02* | (2006.01) |
| *C10L 9/08* | (2006.01) |
| *B30B 3/04* | (2006.01) |
| *C10B 45/02* | (2006.01) |

(52) U.S. Cl.
CPC ............... *C10B 53/02* (2013.01); *C10B 47/44* (2013.01); *C10B 57/02* (2013.01); *C10L 9/083* (2013.01); *B30B 3/04* (2013.01); *C10B 45/02* (2013.01); *C10L 2290/06* (2013.01); *C10L 2290/08* (2013.01); *C10L 2290/28* (2013.01); *C10L 2290/30* (2013.01); *C10L 2290/545* (2013.01); *C10L 2290/58* (2013.01); *Y02E 50/14* (2013.01); *Y02E 50/15* (2013.01); *Y02E 50/30* (2013.01)

(58) Field of Classification Search
None
See application file for complete search history.

(56) References Cited

U.S. PATENT DOCUMENTS

| | | | | |
|---|---|---|---|---|
| 3,899,965 | A * | 8/1975 | Koch et al. | 100/155 R |
| 4,612,017 | A * | 9/1986 | Lindell | 44/576 |

(Continued)

FOREIGN PATENT DOCUMENTS

| | | |
|---|---|---|
| GB | 1485448 A | 9/1977 |
| WO | 2012074388 A1 | 6/2012 |
| WO | WO 2012074388 A1 * | 6/2012 ............... C10L 9/083 |

OTHER PUBLICATIONS

Nalladurai Kaliyan, R. Vance Morey, Factors affecting strength and durability of densified biomass products, Biomass and Bioenergy, vol. 33, Issue 3, Mar. 2009, pp. 337-359, ISSN 0961-9534, http://dx.doi.org/10.1016/j.biombioe.2008.08.005. (http://www.sciencedirect.com/science/article/pii/S0961953408002146).*

(Continued)

*Primary Examiner* — In Suk Bullock
*Assistant Examiner* — Jonathan L Pilcher
(74) *Attorney, Agent, or Firm* — Brooks Kushman P.C.

(57) ABSTRACT

A system for producing a torrefied biomass that at least partially replaces coal in coal-fired processes. The system comprises: a feed bin for receiving carbonaceous feedstock, conveying the ingested feedstock and treating the ingested feedstock to produce modified feedstock; a dryer that treats the modified feedstock to produce dried feedstock, the dryer including a heater that warms the dried feedstock to produce heated feedstock; a torrefaction subassembly; a particle downsizing system; a separator for separating minerals from the feedstock; and a compactor.

17 Claims, 14 Drawing Sheets

(56) References Cited

U.S. PATENT DOCUMENTS

| | | | |
|---|---|---|---|
| 6,375,690 B1* | 4/2002 | Gunnink et al. | 44/594 |
| 6,492,149 B1* | 12/2002 | Muller-Feuga | 435/173.8 |
| 2003/0221363 A1 | 12/2003 | Reed | |
| 2007/0289861 A1 | 12/2007 | Barkdoll et al. | |
| 2008/0022595 A1* | 1/2008 | Lemaire et al. | 48/209 |
| 2008/0263891 A1 | 10/2008 | Brunet | |
| 2009/0007484 A1 | 1/2009 | Smith | |
| 2009/0250331 A1 | 10/2009 | Hopkins et al. | |
| 2009/0272027 A1 | 11/2009 | Ruiters | |
| 2010/0083530 A1* | 4/2010 | Weisselberg et al. | 34/505 |
| 2010/0242351 A1 | 9/2010 | Causer | |
| 2010/0287823 A1 | 11/2010 | Misra et al. | |
| 2011/0179700 A1* | 7/2011 | Monroe et al. | 44/589 |
| 2011/0179701 A1* | 7/2011 | Grassi | 44/606 |
| 2011/0214343 A1* | 9/2011 | Wechsler et al. | 44/605 |
| 2012/0017499 A1* | 1/2012 | Leonhardt | 44/606 |
| 2012/0066967 A1* | 3/2012 | Rinker | 44/591 |

OTHER PUBLICATIONS

Yadong Li, Henry Liu, High-pressure binderless compaction of waste paper to form useful fuel, Fuel Processing Technology, vol. 67, Issue 1, Jun. 2000, pp. 11-21, ISSN 0378-3820, http://dx.doi.org/10.1016/S0378-3820(00)00092-8. (http://www.sciencedirect.com/science/article/pii/S0378382000000928) Keywords: Compaction; Fuel; Logs; High-pressure; H.*

International Search Report and Written Opinion; International application No. PCT/IB 13/02126; date of mailing May 13, 2014.

International Preliminary Report on Patentability; International application No. PCT/IB2013/002126; date of issuance of report Feb. 24, 2015.

* cited by examiner

TORREFACTION APPARATUS AND PROCESS

BACKGROUND OF THE INVENTION (1) Field of the Invention

One aspect of this disclosure relates to a manufacturing apparatus and process to produce a torrefied biomass or biocoal that can replace coal in coal-fired systems such as gasification, pyrolysis and combustion.

(2) Background Art

Biomass aids in meeting the targets established by the Kyoto Protocol and the Copenhagen Accord. Also, using biomass for energy production can meet the Renewable Energy Portfolios of U.S. States.

Initially, using raw-biomass seemed the most promising solution to reduce greenhouse gases. Indeed, co-firing raw-biomass in coal-fired boilers has been attempted for demonstration and commercial purposes. However, problems have been encountered, the most important of which is grindability of the raw-biomass (others are high bulk volume moisture content, low calorific value, hydrophobic material, thermal instability and production of undesired tars). Using torrefied-biomass, or simply biocoal, as a replacement of coal solves many of the problems encountered in using raw-biomass because during torrefaction, hemicelluloses, made of polysaccharides, is decomposed and changes the viscoelastic properties of the biomass and improves grindability. Furthermore, biocoal will merge into existing technologies with no added technological complications, nor large capital or operation costs.

It is expected that electricity production by coal-fired utility boilers will continue to be stable at ~45% of total production in the next 30 years. Coal's efficiencies and energy-generation capabilities are well documented. However, it is accompanied by high levels of $CO_2$ and other emissions. Biocoal offers many of the same benefits of coal and also: (1) significantly reduces emissions ($CO_2$, $NO_x$, $SO_x$, mercury, PAH, particulates); (2) can be cost-competitive with coal. Replacing 20-25% of coal by biocoal can be achieved in 10 years. Therefore it is important to develop torrefaction processes. Torrefaction has been shown to decrease volatile matter in biomass, making biocoal safer for grinding due to a lower risk of self-ignition. Temperature and residence time were found to have a great effect on: (1) the chemical properties and durability of torrefied-biomass; (2) the behavior of oxidation biocoal; (3) syngas production in gasification; (4) increasing the hydrophobic nature of biomass. As a consequence, biocoal can be considered a premium drop-in biofuel with properties similar to coal that can be controlled to match those of a given coal.

Among the patent references considered before filing this application were:

US20080263891 A1: Process for treating lignocellulosic material, and apparatus for carrying out the same;

US20030221363: Process and apparatus for making a densified torrefied fuel;

US20090250331 A1: Auto thermal and mobile torrefaction devices;

US20090272027 A1: Method for the preparation of solid fuels by means of torrefaction as well as the solid fuels thus obtained and the use of these fuels;

US20110179700 A1: System and methods for torrefaction and processing of biomass.

BRIEF SUMMARY OF THE INVENTION

One aspect of this disclosure relates to a torrefaction process and the resulting biocoal product.

Another aspect involves a process for producing a new material, referred to as torrefied-biomass or biocoal that can replace coal in coal-fired systems such as gasification, pyrolysis and combustion. Biocoal is considered a drop-in fuel to be used in existing coal fired systems without the necessity to retrofit or upgrade them.

The disclosed process and related manufacturing apparatus uses a variety of feedstock types, including woody, herbaceous and other biomass types as well as waste streams that include any organic material such as municipal solid wastes and scrap tires.

Described herein is a method and apparatus for the production of torrefied biomass (referred to herein as "biocoal") from all carbonaceous materials, including, but not restricted to, plant biomass, carbonaceous wastes (for example municipal solid waste—MSW), synthetic carbonaceous materials (for example plastic polymers), animal manure, sewage, and other carbonaceous materials, to produce customized biocoal with properties required for a specific application, such as combustion, gasification and pyrolysis.

In several embodiments, the torrefaction process of this disclosure is automatically controlled to provide a customized biocoal, including but not restricted to volatile matter, fixed carbon content, moisture content, calorific value, level of hydrophobicity, endurance, density, and strength. The control parameters of the process include moisture content, heating rate, residence time, temperature, oxygen content, feed rate, feedstock type, and chlorine content.

One aspect of the disclosed torrefaction system involves several stages that use difference manufacturing components. Each stage has its own characteristics according to the specific properties of the material and the process control parameters, from the input feed (for example wet biomass, MSW), through drying, heating, torrefaction, grinding, compaction, cooling, and finally of the output biocoal for storage.

None of the above-listed patent references or others of which applicant is aware disclose or suggest a control system for producing customized biocoal using a multi-stage process in which each stage has different characteristics according to needs.

In an exemplary approach, the disclosed torrefaction process and manufacturing apparatus has up to six stages, some of which are optional:

Stage I: A feed process step that ensures smooth and controlled feedstock ingestion that operates automatically (feed bin #1 in FIG. 1).

Stage II: A drying process step that operates anaerobically to avoid potential fire and give full control over the biocoal properties, occurring at about 120-150° C. (dryer #3 in FIG. 1).

Stage III: A torrefaction process step that comprises:
  A) fast heating in the absence of oxygen to avoid potential fire and have full control over the biocoal properties, occurring from the drying temperature through about 200° C. for at a short time of 2-5 minutes (heater-1 #5 in FIG. 1);
  B) further heating in absence of oxygen in order to avoid potential fire and have full control over the biocoal properties, occurring from the temperature reached in previous step (about 200° C.) up to about 280-320° C. for at a short time of about 5-10 minutes (heater-2 #6 in FIG. 1).
  C) maintaining a constant temperature for a desired residence time to complete the torrefaction step without external heating by using the exothermic phase transition that lignin undergoes and feeds heat into the system (reactor #7 in FIG. 1). Torrefaction is carried out in absence of oxygen in order to avoid potential fire and have full control over the biocoal properties.

Stage IV: A downsizing (grinding) step that involves reducing the biocoal particles to 30-1000 microns at high temperatures required for the compaction (mill #12 in FIG. 1).

Stage V: A mineral matter separation step, after downsizing, that separates the mineral matter from the biocoal particles. Experimenters have observed that after grinding, most of the mineral matter is separated from the biocoal particles. Therefore separation of these two components is much easier than if the mineral matter remained within the biocoal particles. The biocoal produced after separation is a high grade, beneficiated fuel with very little risk of producing slagging in pulverized coal-fired boilers (separator #14 in FIG. 1).

Stage VI: A compaction process (compactor #15 in FIG. 1) step, which is optionally required to increase the energy efficiency of the entire process and produce biocoal with high durability and strength, that is hydrophobic, has a high energy density, is safe, has a hard grove index comparable with coal mills, and acts as a drop-in to a coal plant. This step requires milling and compaction. The potential for fire is high at this size range. Therefore grinding and compaction must be carried out in the absence of oxygen. An automatic control system has been developed that ensures absence of oxygen, and is discussed below.

Some of the above stages release gas streams that must be pumped and treated according to the nature of the gas composition.

DETAILED DESCRIPTION OF THE INVENTION

Figure 1:
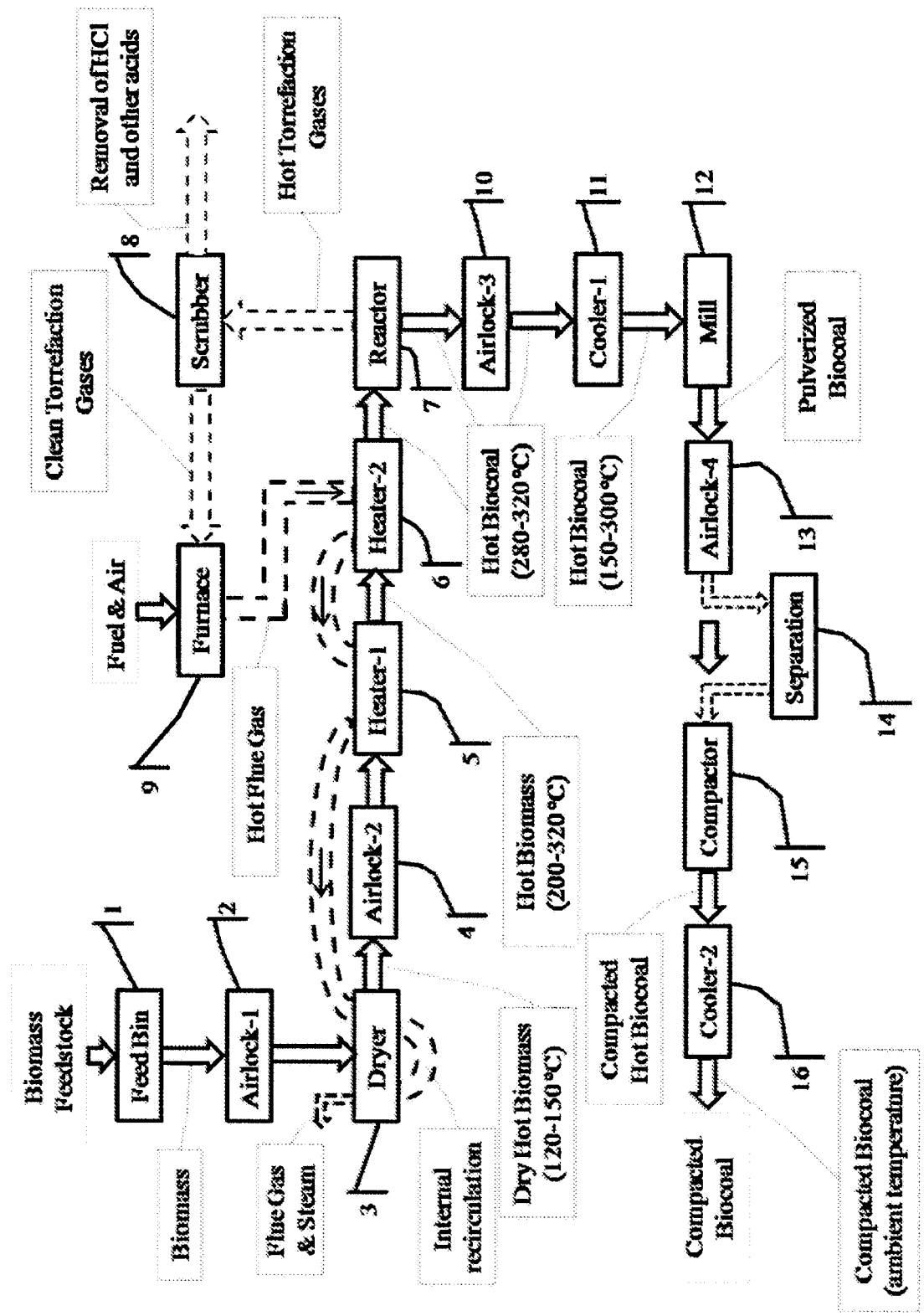
FIG. 1 is an overview of one embodiment of the torrefaction system that produces biocoal using all the above stages.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Correlation tables of reference numerals and the components which they identify appear at the end of this section of our patent application.

The first step is to shred the biomass feedstock to pieces that preferably are about 6-15 mm in size. Reduced size allows efficient heat transfer from the various reactors (downstream) and yet is affordable from the economic stand point of the cost of the biomass shredding. The inventors have tested many types of feedstock that can be used in practicing the disclosed process: carbonaceous materials such as woody biomass, agricultural wastes, forest wastes, garden residues, plastic materials, municipal solid waste (MSW) and scrap tires. Each can yield biocoal that is suitable for firing. The fact that one can use any type of carbonaceous material is a useful feature of the disclosed process—particularly the use of MSW and its potential to solve ecological and environmental problems.

What now follows is a more detailed description of the various stages of our torrefaction system.

Stage I—The Feed Bin

The feed bin (#1 in FIG. 1) is the first station at which the biomass is fed into the torrefaction facility. The feed bin also acts as a buffer and control that enables smooth flow of the carbonaceous feedstock. FIG. 2 shows an example of a feed bin as an integrated unit that operates smoothly and controllably. It is difficult to flow biomass at the desired size range (6-15 mm) because it causes bridging and inhomogeneous flow.

These two issues are solved in the feed bin that is described below. The feedstock is fed into a storage tank (#1 in FIG. 2) and is released from the bottom (#2 in FIG. 2) of the storage tank by a paddle conveyor (#3 in FIG. 2) that collects the feedstock homogeneously from all parts of the storage tank and not from a specific part of the tank.

The flow rate of the feedstock emanating from the feed bin is corrected according a signal related to mass flow measured downstream by changing the rotation speed of the paddle conveyor (preferably by a variable frequency motor).

To determine any bridging occurring during the feed operation, a density sensor (#4 in FIG. 2) (based on ultrasound for example) can optionally be placed on one of the walls of the storage tank. The sensor can measure the bulk density of the feedstock within the tank. When the sensor detects a decrease in the density it can send a signal to the controller (see below).

A control system (#6 in FIG. 2) reads the signal from the density sensor and operates gas jet devices in response to a predetermined density value. Should the density remain below the predetermined set value, the controller trips the feed system in response to an alarm that announces the low density condition. The control device therefore enables smooth operation of the feeding step.

As required, the controller operates a set of gas jet devices (#5 in FIG. 2), which can provide air or an inert gas, depending on the density of the feedstock within the bin. The gas jet devices are placed at various locations upon the bin walls in order to inject sudden gas jets that will break the bridges and allow flow to occur more smoothly.

Stage II—The Dryer

Figure 3:
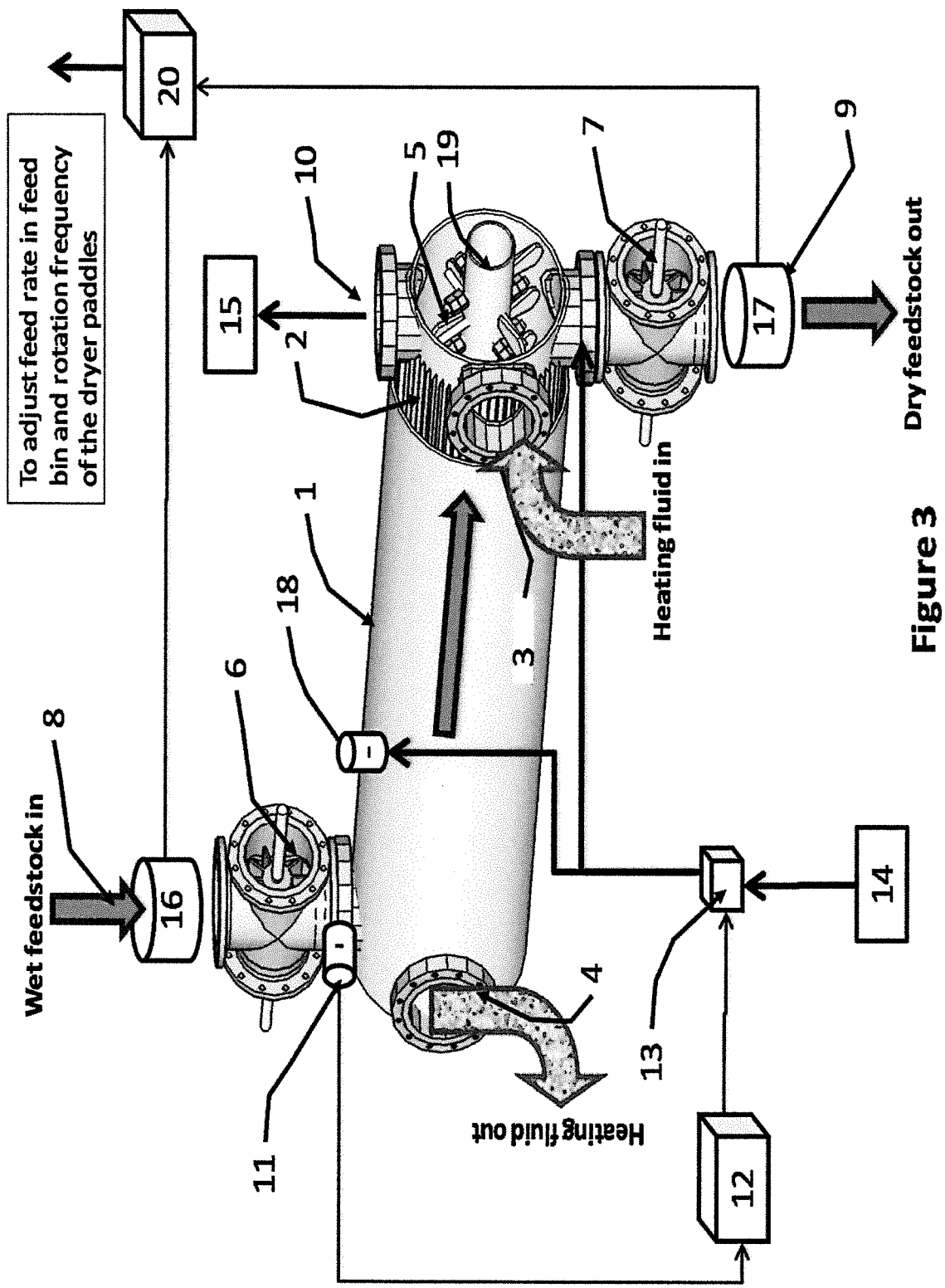
FIG. 3 illustrates a dryer.

The dryer, shown in FIG. 3 (referenced with #2, 3, and 4 in FIG. 1), is a standalone device but is also an integral part of the torrefaction process. It serves three main purposes:

i. drying the feedstock to yield up to a zero moisture feedstock which is controlled automatically;

ii. buffering to prevent any air leak into the downstream reactors;

iii. heating the feedstock in a first step.

The dryer is a sealed, automatically operated device that solves these three issues. Following is a description of the dryer system.

The feedstock is conveyed through an inlet (#8 in FIG. 3) into an airlock 1 (#2 in FIG. 1 and #6 in FIG. 3), which is required to prevent air from leaking into the downstream reactor system as it might burn the feedstock, thus raising safety concerns and potentially causing operational problems. The airlock, based on a rotary valve, can be adjusted to enable the smooth flow of the feedstock and to minimize leakage of air. This is achieved by adjusting the space between the vanes of the rotary valve, and/or their pitch and shaft rotation speed such that the rotary valve will always be filled with feedstock.

The feedstock is then conveyed into an externally heated device that dries and warms the feedstock (#1 in FIG. 3) while ensuring that there is minimal leakage of air into the dryer—in most dryers hot flue gases with oxygen content flow into the dryer. External heating is achieved by using for instance a double jacket cylindrical reactor (#1 in FIG. 3) with fins/spirals/bulges ("protrusions") to promote heat exchange for maximum heat transfer that extend from the external surface of the inner tube (#2 in FIG. 3)—see also FIGS. 4 and 5 for further detail of the finned/bulged jacket.

Heat is provided from: (i) flue gas that is generated by a burner/furnace (#9 in FIG. 1) and/or (ii) a closed-loop steam generation system through a hot gas/steam that circulates. Hot flue gas or steam flows in a direction that is opposite to that of the feedstock, into opening #3 in FIG. 3 and exits through opening #4. The inner tube through which the feedstock flows has a paddle conveyor (#5 in FIG. 3) that ensures good heat transfer of the feedstock to the dryer's walls from which heat is transferred to the feedstock particles. The paddle conveyor fills this device up to 80% of its volume (most similar devices operate at 15-25% of their volumes) which makes the present device compact and low cost.

The paddles in the conveyer can be plain (#3 in FIG. 6) or have bulges (#4, in FIG. 6) or protuberances for better heat transfer. To assist heat transfer, the inner side of the shaft (#19 in FIG. 3, #1 in FIG. 7) of the externally heated device is provided with protuberances (#2 in FIGS. 6, 7). The temperature in the dryer increases along its axis from an inlet ambient temperature to about 150° C.

Oxygen content in the device is controlled as follows. An oxygen sensor (#11 in FIG. 3) is placed preferably on the wall of the dryer. It measures the oxygen content and sends a signal to a controller (#12 in FIG. 3) that has a predetermined value for the oxygen content. When the value of the oxygen content is above the predetermined value, the controller operates an activating device (pneumatic or other—#13 in FIG. 3) that opens a valve which admits inert gas from an inert gas tank. The inert gas can be for example nitrogen or carbon dioxide (#14 in FIG. 3). It flows through gas flow devices (#18 in FIG. 3). Should the oxygen remain above the predetermined set value, the controller will trip the entire system and send an alarm that signals high oxygen content.

Moisture content in the feedstock is controlled as follows. The moisture in the feedstock is monitored in real-time and is measured on-line. The moisture in the feedstock prior to flowing into the first rotary valve is measured by a moisture meter (#16 in FIG. 3). It is also measured at the outlet (#17 in FIG. 3) of the second rotary valve at airlock-2 (#4 in FIG. 1 and #7 in FIG. 3). The moisture meters (#16 and 17 in FIG. 3) send signals related to the moisture content to a controller (#20 in FIG. 3). The controller can vary the feedstock feed rate by changing the paddle rotation speed and accordingly synchronize the feed rate from the feed bin to match the required moisture at the outlet. The controller has a set point indicative of the maximum moisture allowed for the feedstock. Should the measured moisture content exceed the set value, the controller adjusts the feed rate from the feed bin and accordingly adjusts the speed of paddle rotation such that the feedstock remains in the dryer for a sufficient time to dry the feedstock to the desired moisture content. The dry feedstock exits the dryer through outlet (#9 in FIG. 3).

Figure 2:
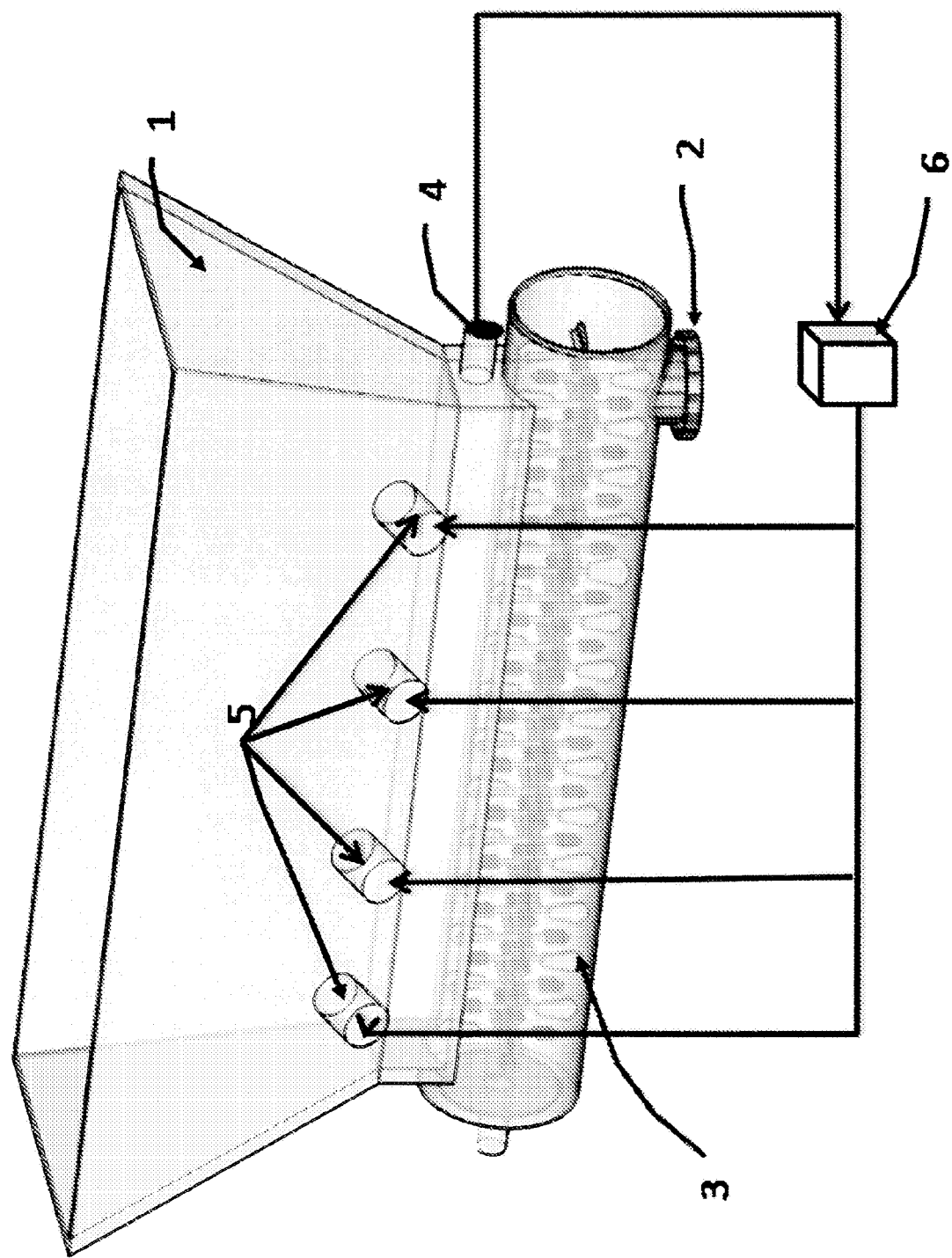
FIG. 2 shows an example of a feed bin as an integrated unit that operates smoothly and controllably.

The dry feedstock flows through airlock-2 (#4 in FIG. 1 and #7 in FIG. 3). Airlock-2 serves two purposes: one is to isolate the dryer reactor and the second is to ascertain that oxygen will not flow to the next reactors in the process. This airlock is similar to airlock-1 because it deals with comparable biomass feedstock characteristics. However, it has to operate at high temperatures (up to 150° C.) and be thermally insulated. This means that precautions should preferably be taken for the bearings to be thermally isolated from the valve itself and perhaps be cooled.

Outlet (#10 in FIG. 3) allows the gas stream to exit from the dryer. Optionally this step is facilitated by an ID fan or an ejector (#15 in FIG. 3).

Stage III—The Torrefaction Subassembly

There are two main versions of the torrefaction subassembly system. Each version is a sealed subsystem with up to three chambers and shares these common features:

A control system with an oxygen control unit keeps oxygen content below a certain value (e.g., 3%) in order to avoid fire and assert full control over the torrefaction process. Oxygen control was described above. Minimizing oxygen content in the torrefaction subassembly is achieved by a similar mechanism to that described in the dryer section (Stage II).

Figure 8:
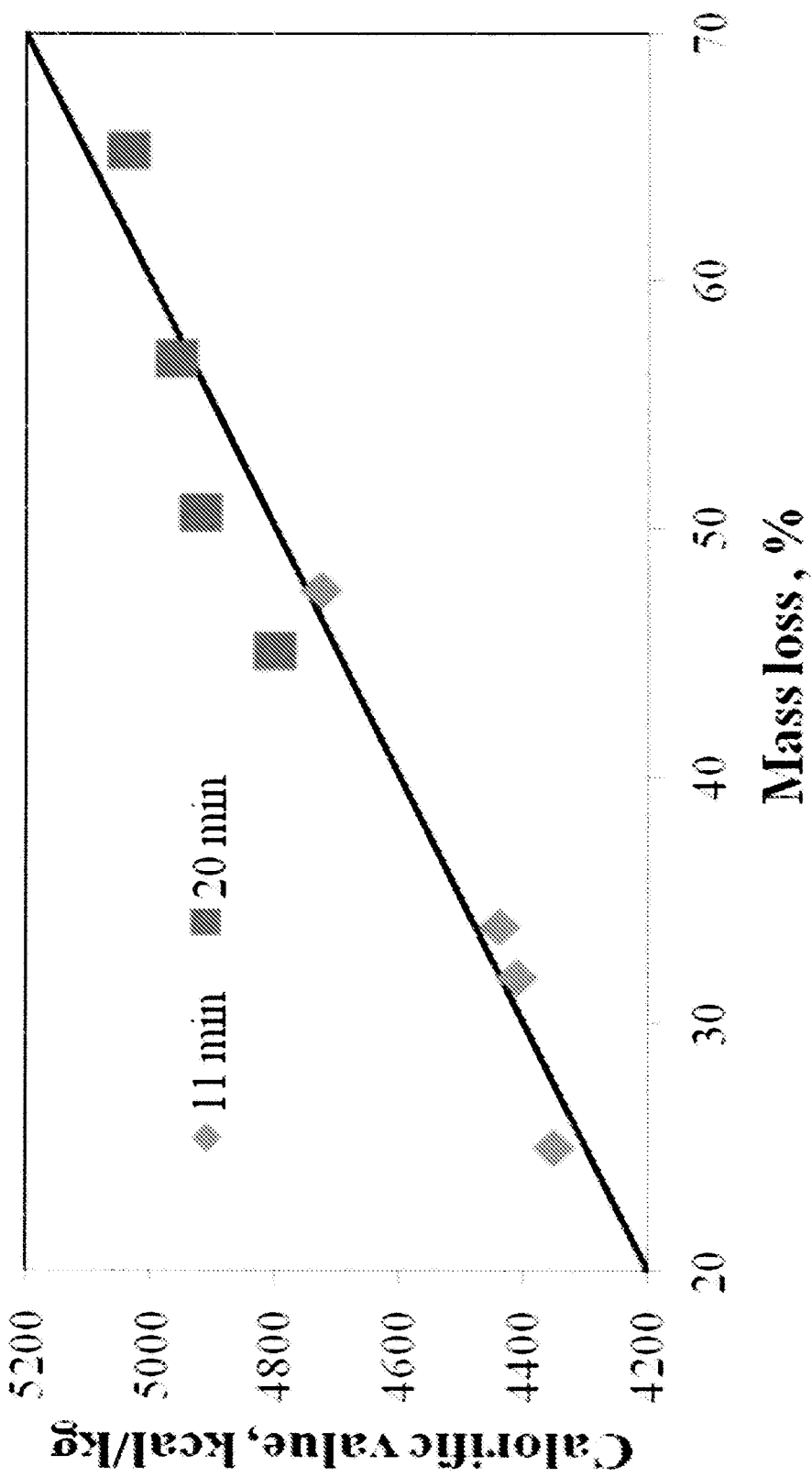
FIG. 8 is a graph of calorific value as a function of mass loss.
Figure 9:
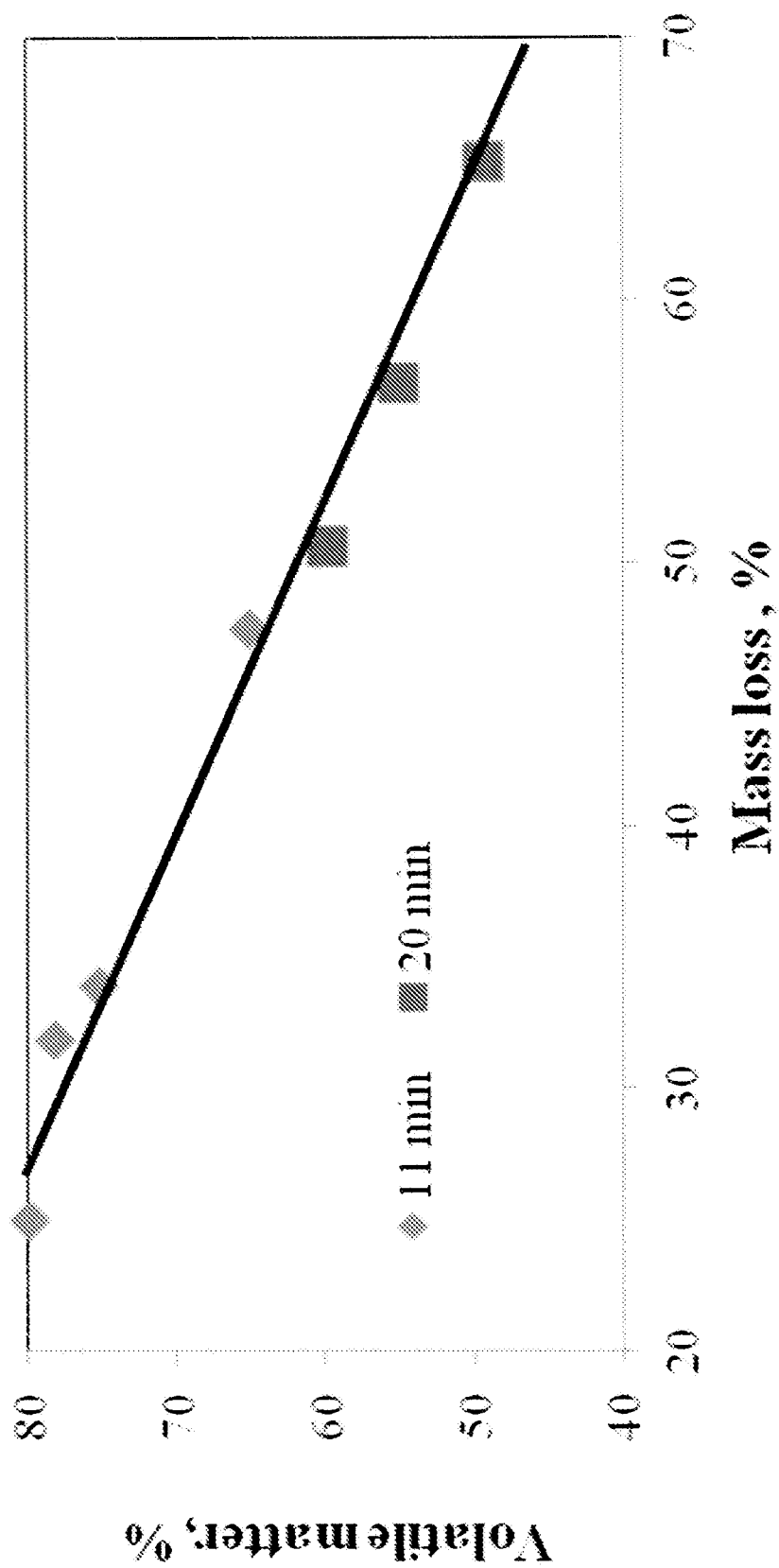
FIG. 9 is a graph of volatile matter as a function of mass loss.

A separate or the same control system measures real-time, on-line the feedstock mass flow rates at the inlet and the outlet of the torrefaction subassembly from which the mass loss during torrefaction is determined. The weight loss of the feedstock during the process is thereby monitored and controlled. Mass loss is correlated to calorific value and to the volatile matter of the biocoal, as seen in FIGS. 8 and 9. FIG. 8 shows calorific value of the biocoal as a function of mass loss during torrefaction that is generally linear. FIG. 9 shows the biocoal volatile matter as a function of mass loss during torrefaction that also is generally linear. Mass loss during torrefaction is a function of temperature and residence time. Hence one can control the main features of the biocoal as required and produce a customized fuel.

Control of the mass loss occurs as follows. Feedstock flows through inlet (#12 in FIG. 10) and mass is measured prior to flowing the feedstock into airlock-2 (#4 in FIGS. 1 and 15 in FIG. 10) by a mass measuring device (piezo-electric for example, #27 in FIG. 10). Mass is also measured at the outlet (#13 in FIG. 10) after airlock-3 (#10 in FIG. 1 and #16 in FIG. 10) of the torrefaction system by another mass measuring device (#28 in FIG. 10). Then the feedstock exits through outlet (#13 in FIG. 10).

Figure 10:
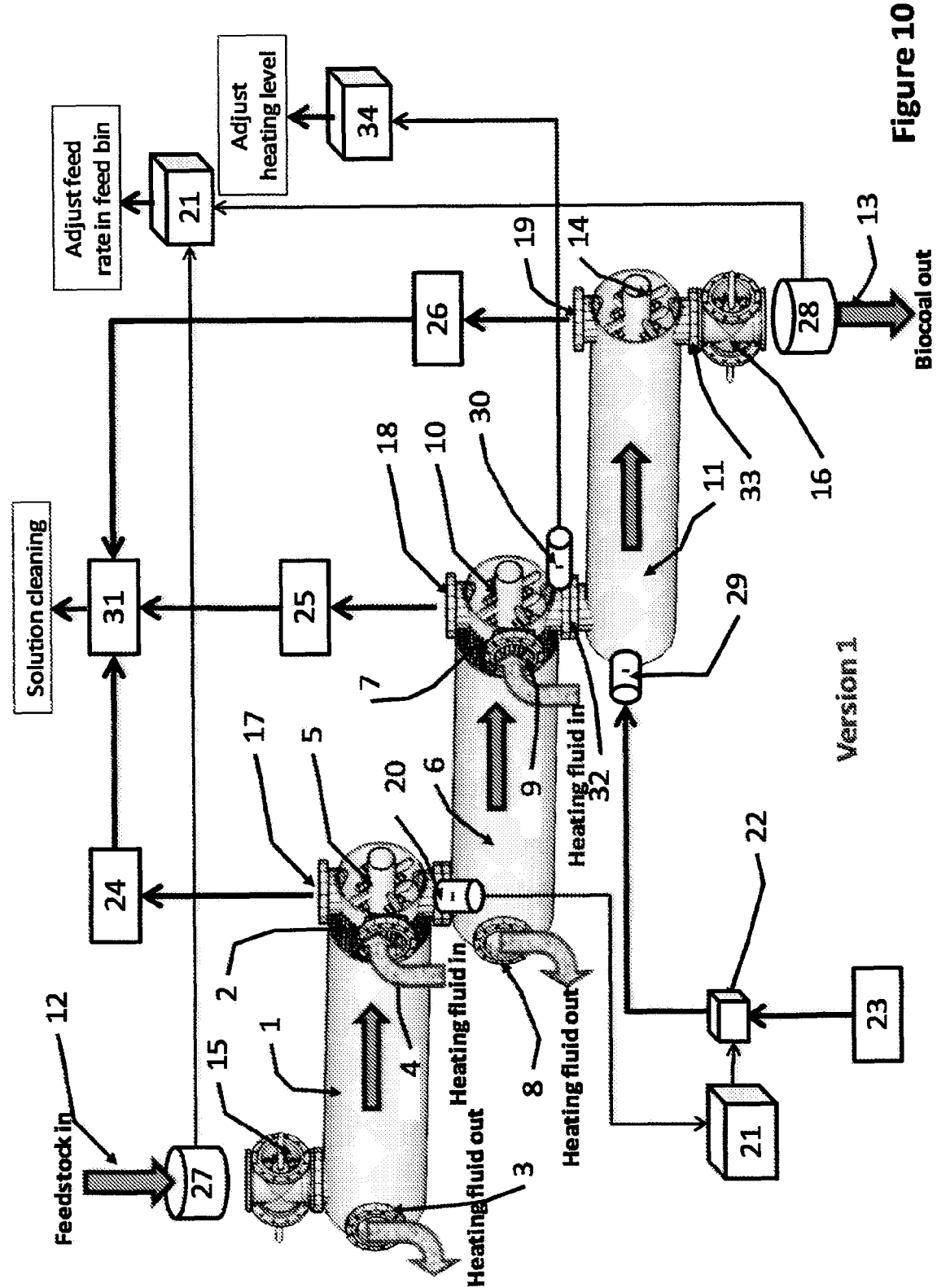
FIG. 10 illustrates various components of one embodiment of a torrefaction system—Version 1.

Signals of the two mass flow meters (in and out) are sent to a controller (#21 in FIG. 10). The controller determines the mass loss by subtraction of the two signals and has a predetermined mass loss value to reach (e.g., about 30%). If the measured value of the mass loss is higher or lower than the predetermined value, the controller sends a signal to the feed bin conveyor to adjust its rotational speed until the measured value reaches the predetermined one.

A scrubbing system cleans most of the acids that are released from the torrefaction process (hydrochloric, acetic, formic, lactic and other acids) and treats the water such that they can be re-circulated to the scrubber. The scrubbing system involves pumping a gas stream produced during the torrefaction process through exits #17, 18, and 19 (in FIG. 10) by exhaust devices (fan or ejectors, #24, 25, 26 in FIG. 10) and is directed into a scrubber (#31 in FIG. 10).

An externally heated device is optionally provided that is similar to the one described for the dryer.

There may be two or more heaters in either or both embodiments of the torrefaction subassembly. Thermal energy is provided by hot fluids, such as flue gases flowing to the inlets of the external jackets, parallel-flow to feedstock at the heater-1 (#1 in FIG. 10) and counter-flow to the feedstock at heater-2 (#6 in FIG. 10; #3 and 9 in FIG. 10). The hot fluids exit through the outlets (#4 and 8 in FIG. 10).

To enhance heating efficiency a recirculation system (FIG. 11) is optionally provided. The gas stream from the torrefaction process, which has some calorific value, is pumped through outlets (#17, 18, 19 of FIG. 10 and #2 in FIG. 11) of the torrefaction system (#1 in FIG. 11) by a fan or an ejector (#24, 25, 26 in FIG. 10 and #3 in FIG. 11). The stream is communicated into a burner or a furnace (#4 in FIG. 11) where external fuel may be supplemented and air supplied to burn the mixture of the torrefaction gas stream and the fuel supplement. The hot flue gas then flows into a gas mixer (#5 in FIG. 11) that mixes the flue gas with ambient air through a control valve (#7-1 in FIG. 11) to reach the desired gas temperature required for heating the heaters. The gas stream from the mixer (#5 in FIG. 11) flows through the inlet of the heater (#8 in FIG. 11) to heat the external jacket of the heater.

A fan or an ejector (#6 in FIG. 11) sucks the hot gases from the outlet of the external jacket of the heater (#9 in FIG. 11) and pushes this gas stream back to the mixer (#5 in FIG. 11) through a control valve (#7-2 in FIG. 11) and back to the heater. A control valve (#7-3 in FIG. 11) connected to a stack is adjusted to bleed hot gases into the stack to keep a constant pressure in the system. The whole system preferably is controlled by a controller (#11 in FIG. 11) that receives a signal from a thermocouple which measures the temperature at the exit of the heater (#10 in FIG. 11). The controller is set at a predetermined temperature and controls the flow of air from the ambient atmosphere by adjusting valve 7-1 (in FIG. 11) to reach that temperature.

A control system in communication with a thermocouple (#30 in FIG. 10) measures in real-time, on-line the temperature of the feedstock exiting from the heaters (#32 in FIG. 10). The thermocouple sends a signal to the controller (#34 in FIG. 10 and #11 in FIG. 11). The controller stores a predetermined temperature that should be reached and interfaces with the heating system to ensure that the temperature of the feedstock at opening (#32 in FIG. 10) equals the predetermined value.

The disclosed torrefaction process can reduce chlorine content in the biocoal as much as required by regulating the torrefaction temperature and residence time by converting chlorinated compounds in the feedstock into hydrochloric acid in the gas phase. At 300° C. chlorine content reduces at a rate of 1.5-1.7% for each 1% of mass loss. This feature is helpful when feedstock contains organic chlorinated compounds because they are responsible for the hazardous emission of dioxins and furans.

Version 1 of the Torrefaction System

FIG. 10 depicts an embodiment of one version of the torrefaction system. Dry feedstock flows into the torrefaction system (#12 in FIG. 10) through a mass measuring device (piezoelectric for example—#27 in FIG. 10). The version shown has three interconnected chambers.

The weighed feedstock flows into an airlock-2 (#2 in FIG. 1, and #15 in FIG. 10), which is required to prevent air from leaking into the downstream reactor system as it might burn the feedstock and cause safety and operational problems. An airlock, based on a rotary valve, is adjusted to enable smooth flow of the biomass feedstock and minimize leakage of air. This is achieved by adjusting the space between the vanes of the rotary valve and the rotation speed of the rotary valve so that the rotary valve will always be filled with feedstock.

The feedstock then flows into a fast heater (#5 in FIG. 1 and #1 in FIG. 10), for example by microwave or radiative heating, then into a slower heater (#6 in FIG. 1 and #6 in FIG. 10) which are similar to the externally heated device (with protuberances #2 and #7 in FIG. 10), and one or more paddle conveyors #5 and 10 in FIG. 10) as detailed in the dryer section (Stage II). The temperature in the heater increases along its axis, from the inlet temperature of 100-150° C. to 280-320° C. at the outlet of the second heater.

The hot feedstock then flows through opening #32 (in FIG. 10) into a non-heated torrefaction reactor (#7 in FIG. 1, #11 in FIG. 10) with the sole objective of keeping the feedstock for the required residence time. The feedstock is moved within the reactor by a paddle conveyor (#14 in FIG. 10) similar to the one described in the dryer section (Stage II). The reactor can be filled up to 95% of its volume, making it compact and low cost.

The biocoal produced in the torrefaction reactor exits opening #33 (in FIG. 10), flows into an airlock (#10 in FIG. 1 and #16 in FIG. 10), then is weighed by a mass measuring device (#28 in FIG. 10) and exits through opening 13 (in FIG. 10).

Oxygen content in the device can be controlled the same way as for Stage II. An oxygen sensor (#20 in FIG. 10) is placed at the wall of the heater that measures the oxygen content and sends a signal to a controller (#21 in FIG. 10) that has a predetermined value for the oxygen content. When the value of the oxygen content is above the predetermined value, the controller operates an activating device (pneumatic or other—#22 in FIG. 10) that opens a valve that allows inert gas to pass from an inert gas tank (e.g., carbon dioxide, #23 in FIG. 10) that flows through gas flow devices (#29 in FIG. 10). Should the oxygen remain above the predetermined set value, the controller will trip the entire system and send an alarm that signals high oxygen content.

Version 2 of the Torrefaction System

Figure 12:
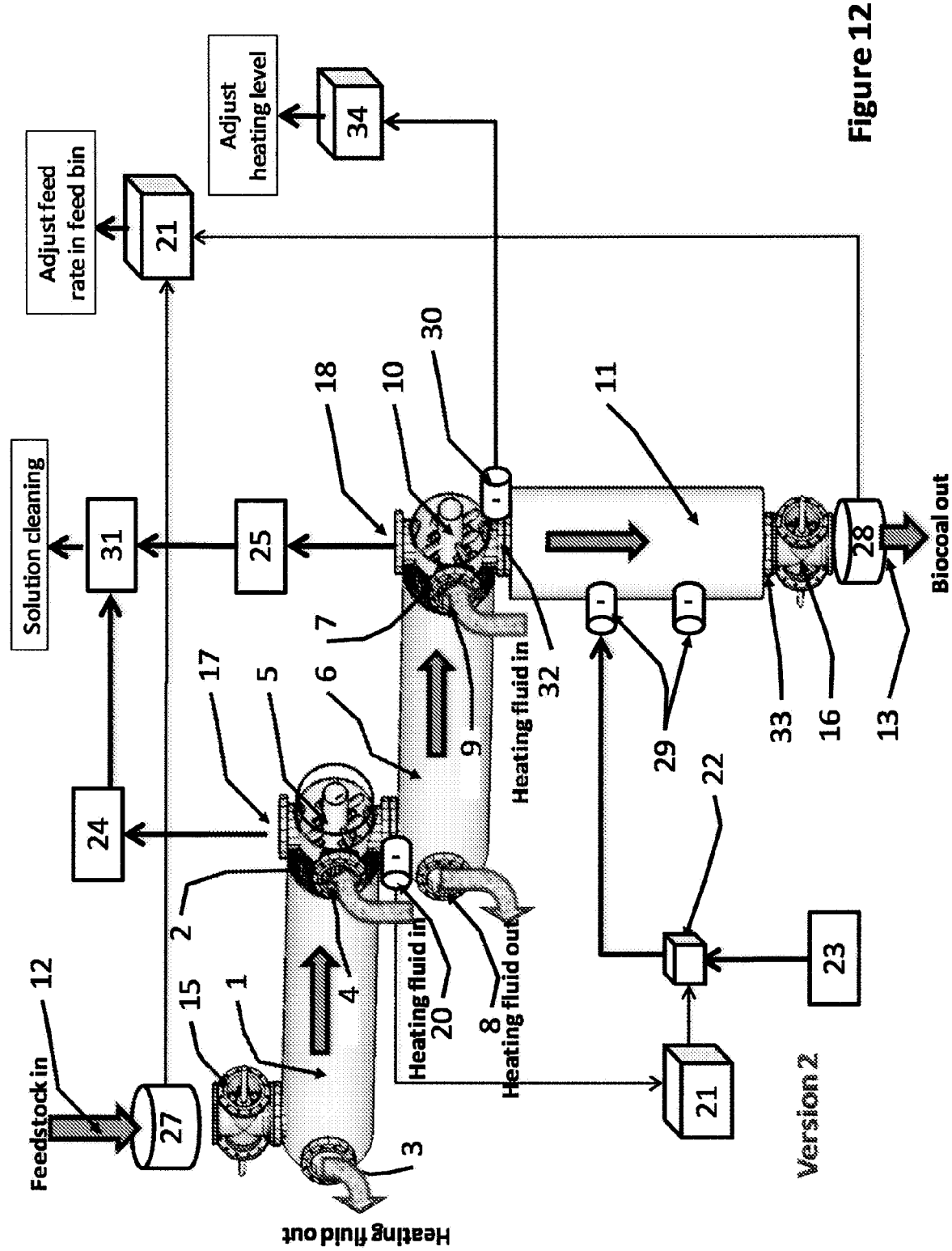
FIG. 12 shows an alternate embodiment of a torrefaction system—Version 2.

FIG. 12 shows Version 2 of the torrefaction system. It comprises identical devices as described in Version 1 above except that the hot feedstock flows through opening #32 (in FIG. 10 and in FIG. 12) into a non-heated torrefaction moving-bed vertically placed reactor (#11 in FIG. 12) with the sole objective of keeping the feedstock for the required residence time. The feedstock is moved within the reactor by means of gravity. The reactor can be filled up to 100% of its volume, making it compact and low cost.

State IV—The Particle Downsizing System

Figure 13:
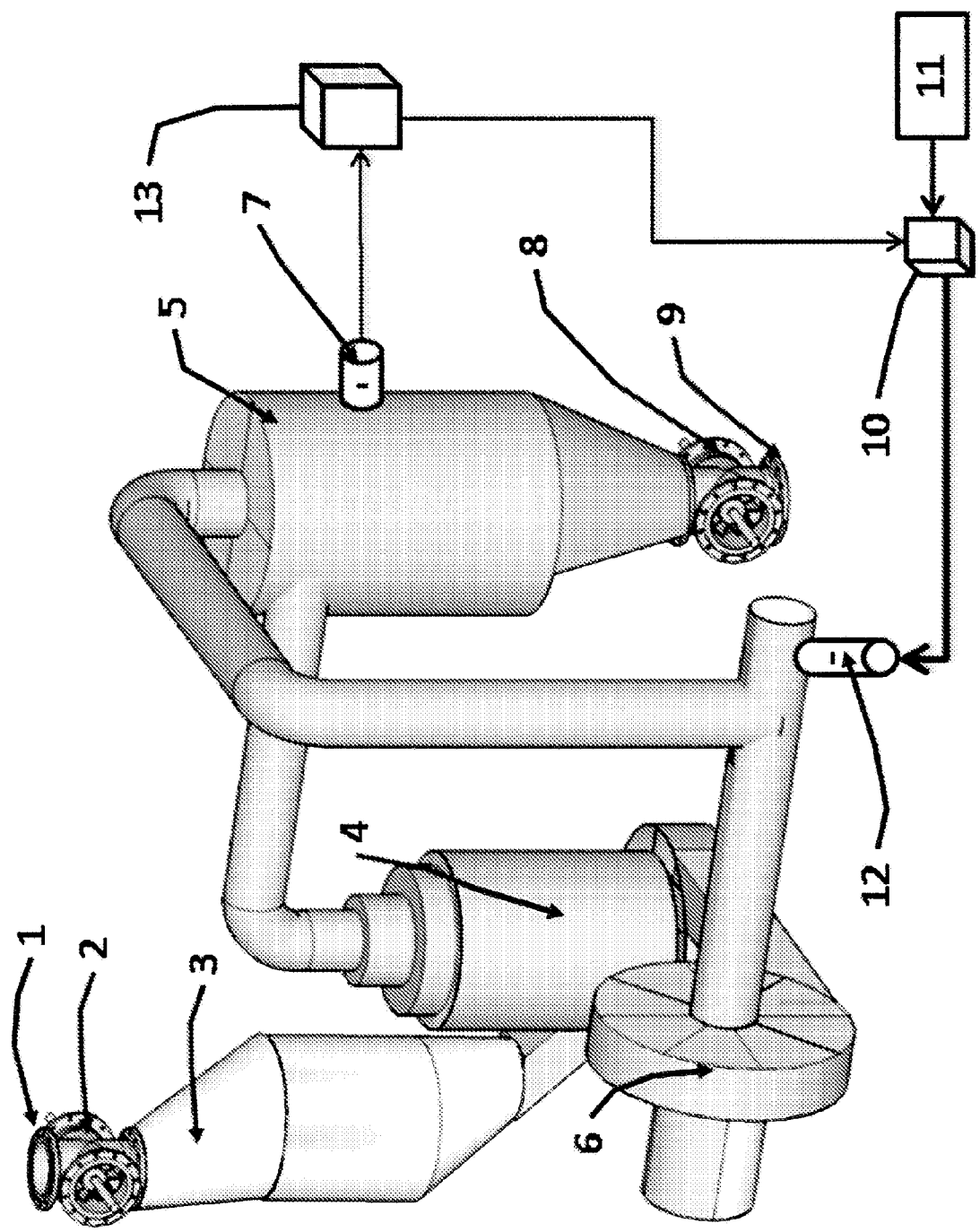
FIG. 13 depicts a downsizing system.

The particle downsizing system, shown in FIG. 13 (comprising #10, 11, 12, and 13 in FIG. 1 and all components if FIG. 13), is a standalone device but also an integral part of the torrefaction process. It serves three main purposes:

i. cooling the biocoal to the temperature required for the compaction process;

ii. grinding the biocoal to the required size for the compaction process;

iii. keeping oxygen below a certain level to prevent fire.

The particle downsizing system is a sealed, automatically operated device that satisfies these purposes. Following is a description of the downsizing system:

1. The biocoal is conveyed into the inlet (#1 in FIG. 13) of the rotary valve, which is the inlet of biocoal and from there into the rotary valve (#2 in FIG. 13). It is then conveyed into a cooler (#3 in FIG. 13) that operates by supplying a mist of water aerosols, just enough to cool down (by water evaporation) the biocoal to the required temperature without having the water absorbed by the biocoal.

2. The biocoal then flows into the grinder (#4 in FIG. 13) that is set to downsize the biocoal particles to the required size for compaction (about 30-1000 microns).
3. The biocoal powder flows into a cyclone (#5 in FIG. 13). The gases are re-circulated between the cyclone and the mill by a gas blower (#6 in FIG. 13). The biocoal powder drops by gravity and fluid-dynamics to the bottom of the cyclone, flows into a rotary valve (#8 in FIG. 13) and exits the system through a rotary valve outlet (#9 in FIG. 13).
4. Control of oxygen in the mill is achieved by placing an oxygen sensor (#7 in FIG. 13) somewhere in the recirculation path that measures the oxygen content. The sensor sends a signal to a controller (#13 in FIG. 13) that has a predetermined value for the oxygen content. When the value of the oxygen content is above the predetermined value, the controller operates an activating device (pneumatic or other—#10 in FIG. 13) that opens a valve which allows inert gas to flow from an inert gas tank (the gas can be any inert gas such as nitrogen or carbon dioxide—#11 in FIG. 13) through gas flow devices (#12 in FIG. 13) into the recirculation path. Should the oxygen remain above the predetermined set value, the controller will trip the entire system and send an alarm that identifies the cause of tripping.

Stage V—Mineral Separation From Biocoal

Biocoal that originates from any type of carbonaceous material may have mineral matter which might cause slagging in a coal-fired boiler. Hence complete or partial removal of the mineral matter will generate a beneficiated biocoal that will perform with reduced slagging in coal-fired boilers. One key to mineral separation is whether or not the mineral particles were separated or detached from the biocoal particles after grinding.

The applicants have tested various carbonaceous feedstock types (woody and herbaceous biomass, municipal solid waste, plastic waste, and others) by surface and chemical analysis techniques. They discovered that 75-95% of the mineral matter is separated (detached) from the biocoal particles. A mineral separation step (for example flotation, coal washing, gravity separation, interfacial, flocculation separation techniques) removes most of the detached mineral particles. Detachment of the mineral matter from the biocoal particles and the ability to separate these mineral particles from the coal particles enhance overall biocoal properties.

Stage VI—Compaction

The compaction stage produces highly compacted biocoal material for the following reasons:
 i. binderless compacted biocoal for cost reduction;
 ii. durability and strength of the compacted biocoal for transportation and storage;
 iii. increase significantly the apparent density of biocoal from 250-350 kg/m$^3$ to 1200-1400 kg/m$^3$ in order to significantly reduce logistics costs (storage and transportation);
 iv. make the biocoal hydrophobic to minimize water absorption during storage;
 v. avoid powder and hence increase safety in storage and operation;
 vi. easier conveyance.

The compaction stage involves these steps:
1. Biocoal powder flows into the inlet of the compaction system, (#1 in FIG. 14) and into a rotary valve (#2 in FIG. 14).
2. Biocoal powder drops into a space prior to the compaction—a sealed space with oxygen control. Oxygen content in the device is controlled by an oxygen sensor (#4 in FIG. 14), placed at the wall of the space prior to compaction that measures the oxygen content and sends a signal to a controller (#9 in FIG. 14) that has a predetermined value for the oxygen content. When the value of the oxygen content is above the predetermined value, the controller operates an activating device (pneumatic or other—#8 in FIG. 14). This device opens a valve that enables inert gas (e.g., nitrogen or carbon dioxide) to flow from an inert gas tank (#10 in FIG. 14) through gas flow orifices (#3 in FIG. 14). Should the oxygen remain above the predetermined set value, the controller will trip the entire system and send an alarm that signals this condition.
3. The powder is pushed into a compactor (two rollers for example, #5 in FIG. 14).
4. The compacted biocoal (briquettes for example) is then conveyed into a cooler (#6 in FIG. 14). It operates by supplying a mist of water aerosols, just enough to cool down (by water evaporation) the biocoal to the required temperature without having the water absorbed by the biocoal.
5. The compacted biocoal then exits through outlet #7 (in FIG. 14) and passes to storage.

Exemplary compaction parameters that produce hydrophobic binderless compacted biocoal having a density of 1200-1400 kg/m$^3$ with high durability and strength include:
(1) a pressure of 2000-4000 bar applied on the compacted biocoal;
(2) size distribution of the biocoal fines in the region of 30-1000 microns;
(3) biocoal powder temperature of 150-250° C.;
(4) compaction time of 1-30 seconds.

Here are correlation tables of reference numerals and the components that they identify in the several Figures of the drawings:

| The Integrated Torrefaction Facility - FIG. 1 | |
|---|---|
| # | Component |
| 1 | Feed bin |
| 2 | Airlock # 1 |
| 3 | Dryer |
| 4 | Airlock # 2 |
| 5 | Heater # 1 |
| 6 | Heater # 2 |
| 7 | Reactor |
| 8 | Scrubber for removal of hydrochloric and other acids |
| 9 | Furnace/burner |
| 10 | Airlock # 3 |
| 11 | Cooler # 1 |
| 12 | Mill for grinding |
| 13 | Airlock # 4 |
| 14 | Separator |
| 15 | Compactor |
| 16 | Cooler # 2 |

| The Feed Bin - FIG. 2 | |
|---|---|
| # | Component |
| 1 | Storage tank for feedstock |
| 2 | Feedstock outlet |
| 3 | Paddle conveyor |
| 4 | Density meter |
| 5 | Gas jet devices |
| 6 | Control system |

| The Dryer - FIG. 3 | |
|---|---|
| # | Component |
| 1 | Double jacket |
| 2 | Internal finned-tube |
| 3 | Inlet hot gas/steam |
| 4 | Outlet hot gas/steam |
| 5 | Paddles |
| 6 | Rotary valve - inlet |
| 7 | Rotary valve - outlet |
| 8 | Wet feedstock inlet |
| 9 | Dry feedstock outlet |
| 10 | Outlet for gas stream |
| 11 | Oxygen sensor |
| 12 | Control device (for example Programmable Logical Controller) |
| 13 | Active device (for example pneumatic/electric valve) |
| 14 | Source of inert gas (tank, vessel, plant, furnace) (N$_2$, or else) |
| 15 | Gas exhaust device (for example ejector/fan) |
| 16 | Moisture analyzer - inlet |
| 17 | Moisture analyzer - outlet |
| 18 | Inert gas jets |
| 19 | Shaft finned or not finned |
| 20 | Control device (for example Programmable Logical Controller) |

Figure 4:
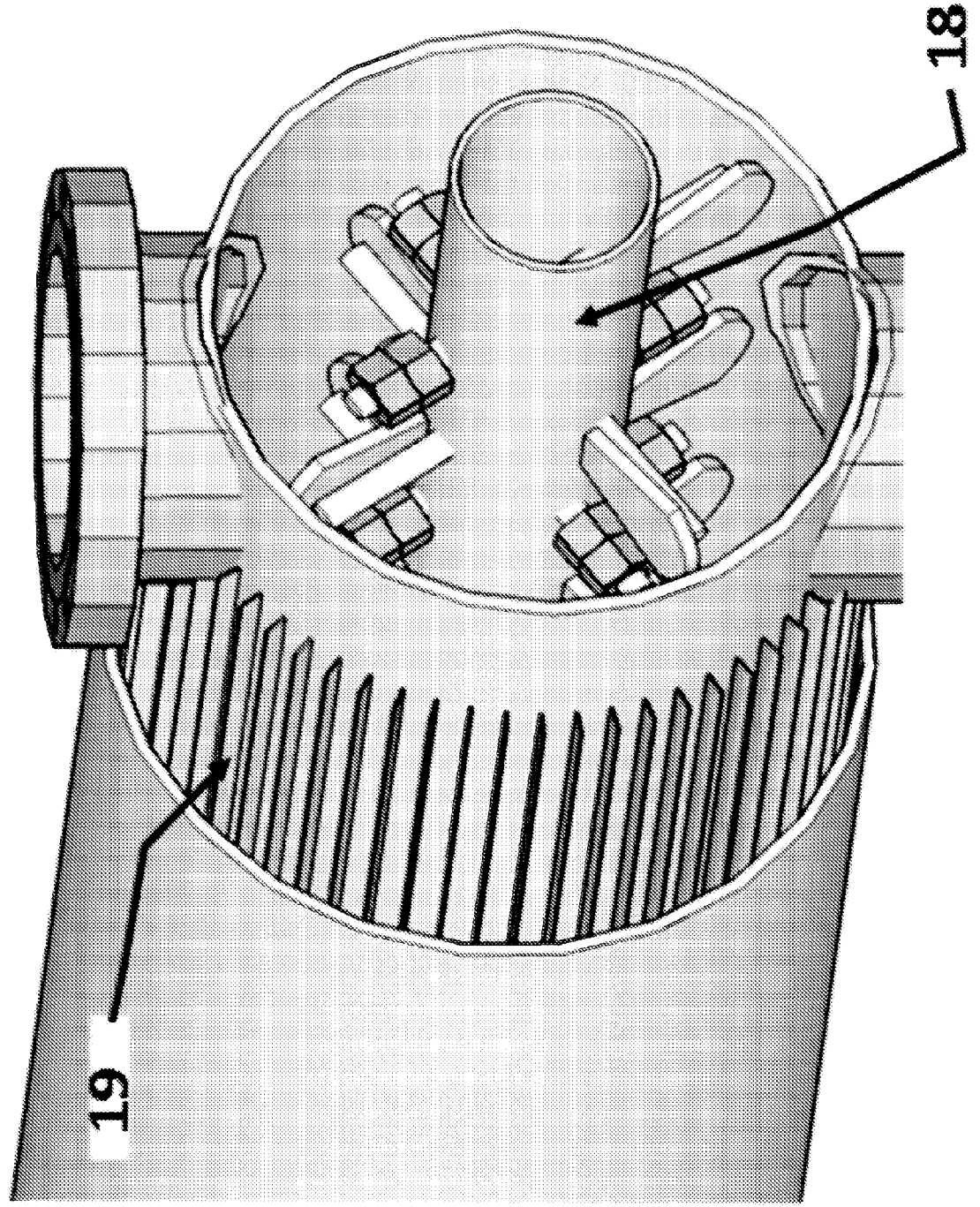
FIG. 4 is a perspective end view of a finned jacket for enhanced heat transfer.

| Double Jacket With Protuberances for better heat transfer - FIGS. 4 | |
|---|---|
| # | Item |
| 1 | Shaft |
| 2 | Fins |

Figure 5:
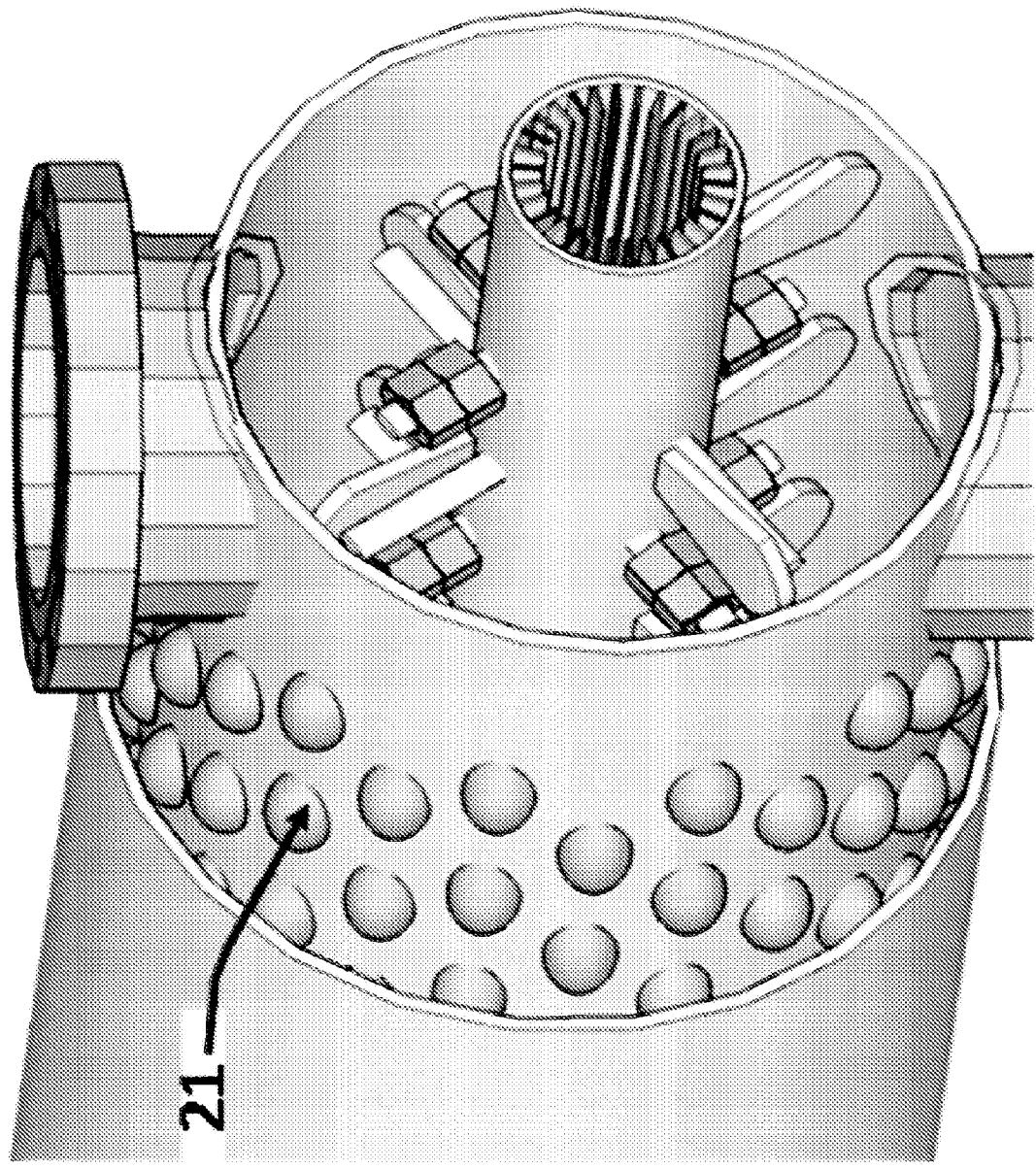
FIG. 5 is a perspective end view of a jacket with protrusions for enhanced heat transfer.

| Double Jacket With Protuberances for better heat transfer - FIGS. 5 | |
|---|---|
| # | Item |
| 1 | Bulges |

Figure 6:
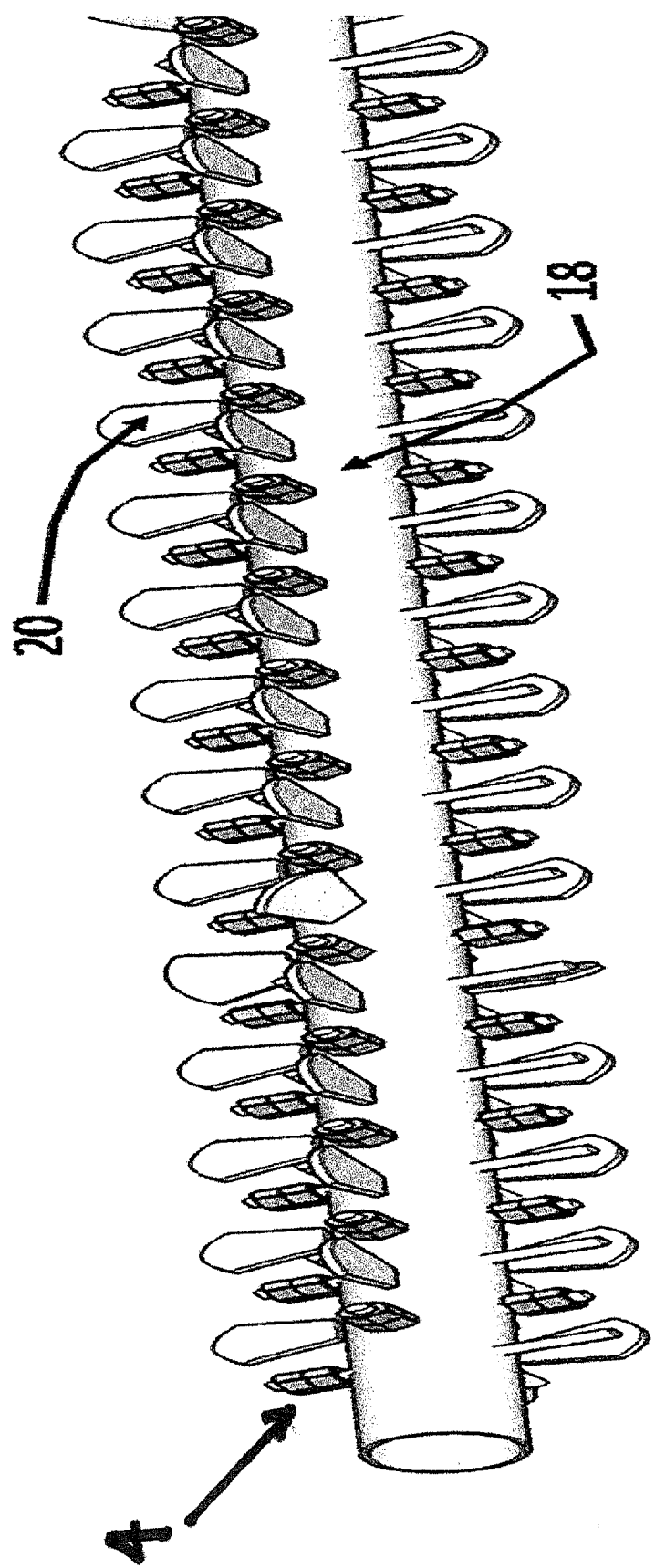
FIG. 6 shows a shaft with paddles extending therefrom.

| The Shaft - FIG. 6 | |
|---|---|
| # | Item |
| 1 | Shaft |
| 2 | Internal fins/bulges for better heat transfer |
| 3 | Paddles |
| 4 | Bulges |

Figure 7:
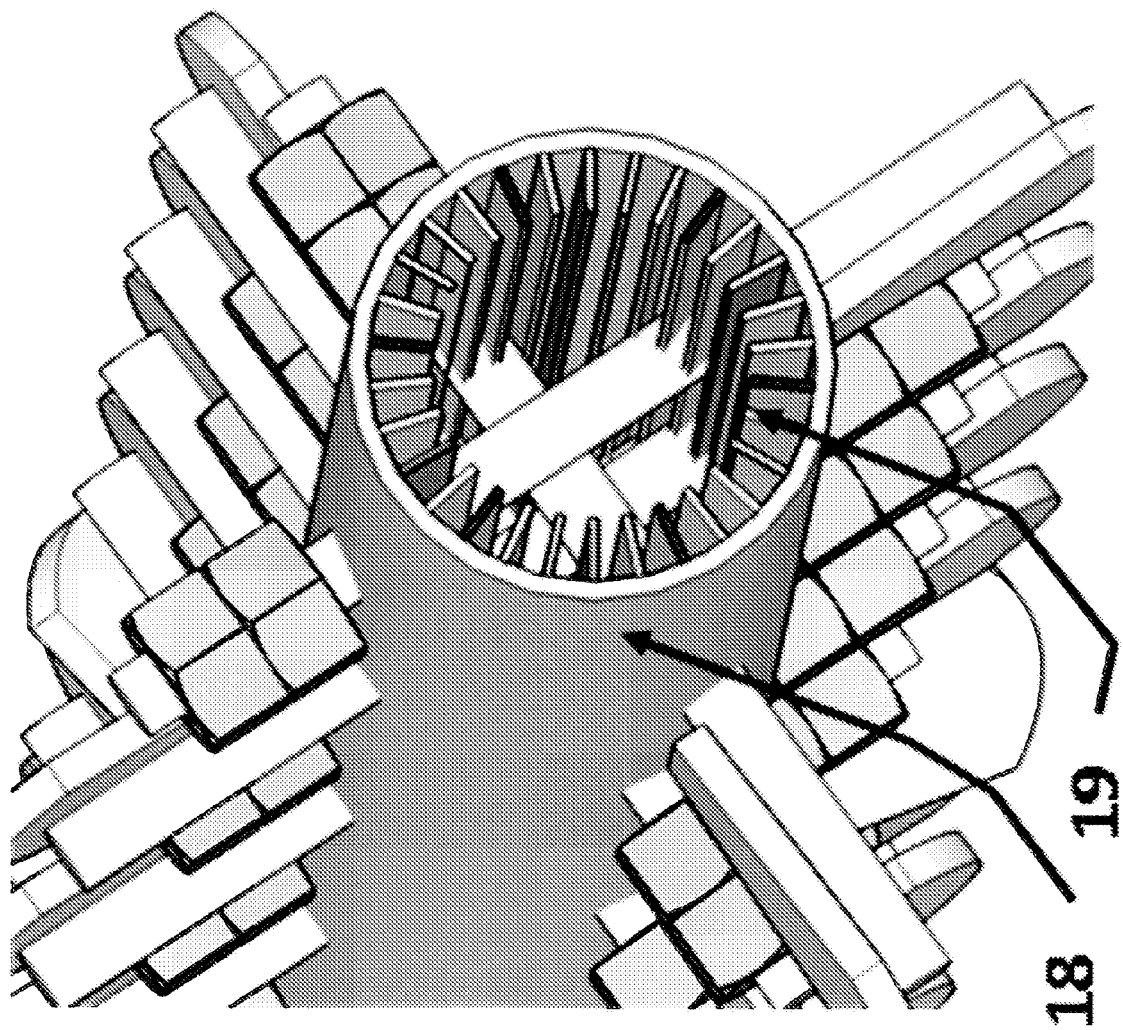
FIG. 7 illustrates fins deployed within a shaft.

| The Shaft - FIG. 7 | |
|---|---|
| # | Item |
| 1 | Shaft |
| 2 | Fins internal |

| The Torrefaction System Version 1 - FIG. 10 | |
|---|---|
| # | Component |
| 1 | Heater-1 with double jacket |
| 2 | Internal finned tube |
| 3 | Inlet hot gas for heating |
| 4 | Outlet hot gases for heating |
| 5 | Paddles conveyor |
| 6 | Heater-2 with double jacket |
| 7 | Internal finned tube |
| 8 | Outlet hot gas for heating |
| 9 | Inlet hot gases for heating |
| 10 | Paddles conveyor |
| 11 | Torrefaction reactor (no heating) based on paddle conveying |
| 12 | Feedstock inlet |
| 13 | Biocoal outlet |
| 14 | Paddles conveyor |
| 15 | Inlet rotary valve |
| 16 | Outlet rotary valve |
| 17 | Outlet of torrefaction gas |
| 18 | Outlet of torrefaction gas |
| 19 | Outlet of torrefaction gas |
| 20 | Oxygen sensor |
| 21 | Control device (for example Programmable Logical Controller) |
| 22 | Active device (pneumatic or electric valve) |
| 23 | Source (tank, vessel, plant, furnace) of inert gas (N2, flue gas) |
| 24 | Evaporation gas exhaust system (for example ejector, fan) |
| 25 | Evaporation gas exhaust system (for example ejector, fan) |
| 26 | Evaporation gas exhaust system (for example ejector, fan) |
| 27 | Mass measuring device (piezoelectric for example) for inlet |
| 28 | Mass measuring device (piezoelectric for example) for outlet |
| 29 | Inert gas jets |
| 30 | Thermocouple |
| 31 | Scrubbing system |
| 32 | Inlet of feedstock to torrefaction reactor |
| 33 | Outlet of the biocoal from the torrefaction system |
| 34 | Control device (for example Programmable Logical Controller) |

Figure 11:
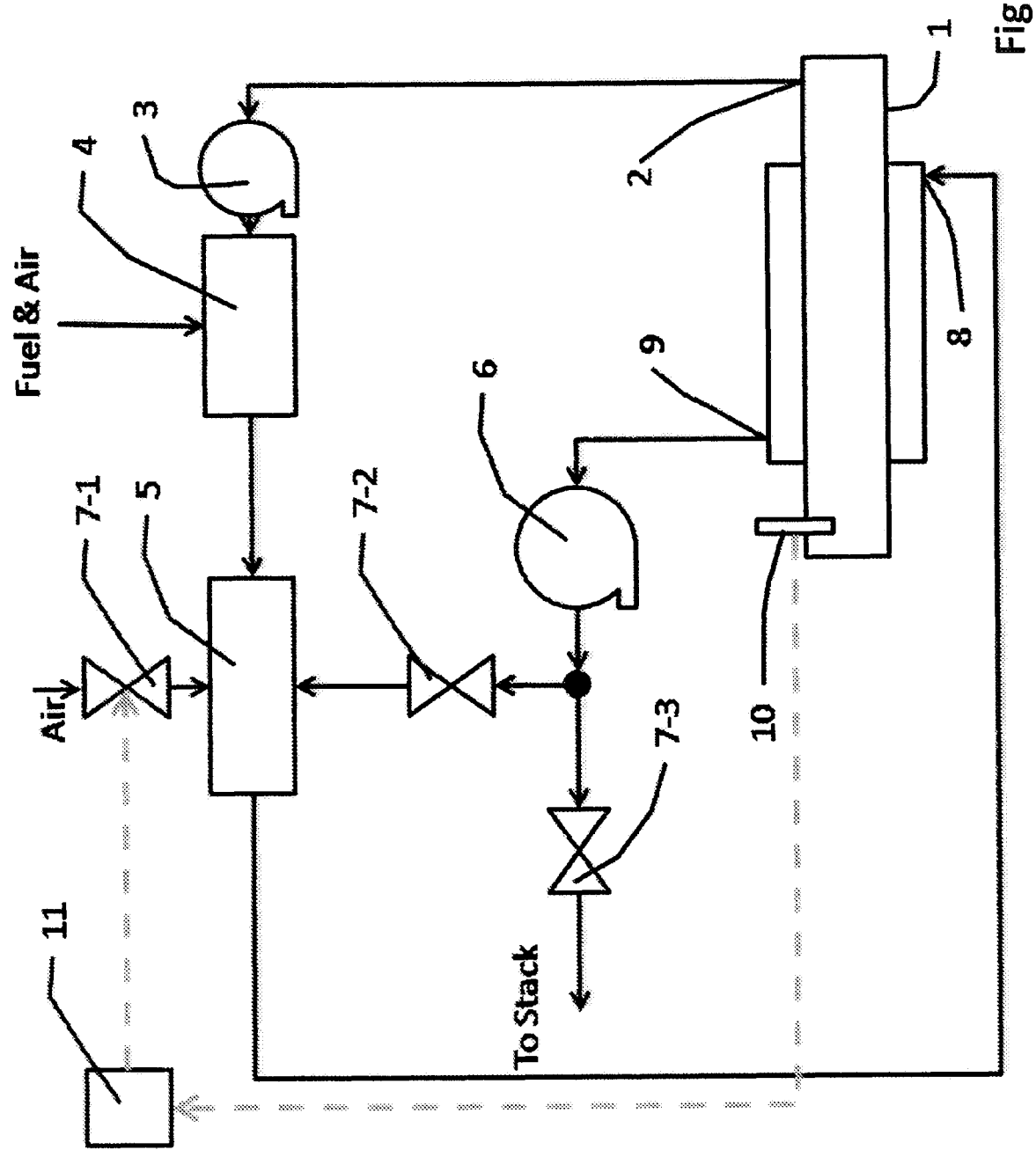
FIG. 11 depicts a recirculation heating system.

| The heating system - FIG. 11 | |
|---|---|
| # | Component |
| 1 | The heating reactors |
| 2 | Outlet of gas stream from torrefaction |
| 3 | Fans/ejectors # 1 |
| 4 | Furnace/burner |
| 5 | Gas mixer |
| 6 | Fans/ejectors # 2 |
| 7-1, 7-2, 7-3 | Control Valves |
| 8 | Inlet of heating gas |
| 9 | Outlet of heating gas |
| 10 | Thermocouple |
| 11 | Controller |

| The Torrefaction System Version 2 - FIG. 12 | |
|---|---|
| # | Item |
| 1 | Heater-1 with double jacket |
| 2 | Internal finned tube |
| 3 | Inlet hot gas for heating |
| 4 | Outlet hot gases for heating |
| 5 | Paddles conveyor |
| 6 | Heater-2 with double jacket |
| 7 | Internal finned tube |
| 8 | Outlet hot gas for heating |
| 9 | Inlet hot gases for heating |
| 10 | Paddles conveyor |
| 11 | Torrefaction reactor (no heating) based on moving bed |
| 12 | Feedstock inlet |
| 13 | Biocoal outlet |
| 15 | Inlet rotary valve |
| 16 | Outlet rotary valve |
| 17 | Outlet of torrefaction gas |
| 18 | Outlet of torrefaction gas |
| 20 | Oxygen sensor |
| 21 | Control device (for example Programmable Logical Controller) |
| 22 | Active device (pneumatic or electric valve) |
| 23 | Source (tank, vessel, plant, furnace) of inert gas (N2, flue gas) |
| 24 | Evaporation gas exhaust system (for example ejector, fan) |
| 25 | Evaporation gas exhaust system (for example ejector, fan) |
| 27 | Mass measuring device (piezoelectric for example) for inlet |
| 28 | Mass measuring device (piezoelectric for example) for outlet |
| 29 | Inert gas jets |
| 30 | Thermocouple |
| 31 | Scrubbing system |
| 32 | Inlet of feedstock to torrefaction reactor |
| 33 | Outlet of the biocoal from the torrefaction system |
| 34 | Control device (for example Programmable Logical Controller) |

| The Downsizing System - FIG. 13 | |
|---|---|
| # | Item |
| 1 | Inlet to rotary valve (inlet of biocoal) |
| 2 | Rotary valve |
| 3 | Cooler |
| 4 | Grinder mill |
| 5 | Cyclone |
| 6 | Gas blower |
| 7 | Oxygen sensor |
| 8 | Rotary valve |
| 9 | Outlet of rotary valve (outlet of biocoal) |
| 10 | Active device (pneumatic or electric valve) |
| 11 | Source (tank, vessel) of inert gas (N2, CO2) |
| 12 | Gas injection device |
| 13 | Control device (PLC) |

Figure 14:
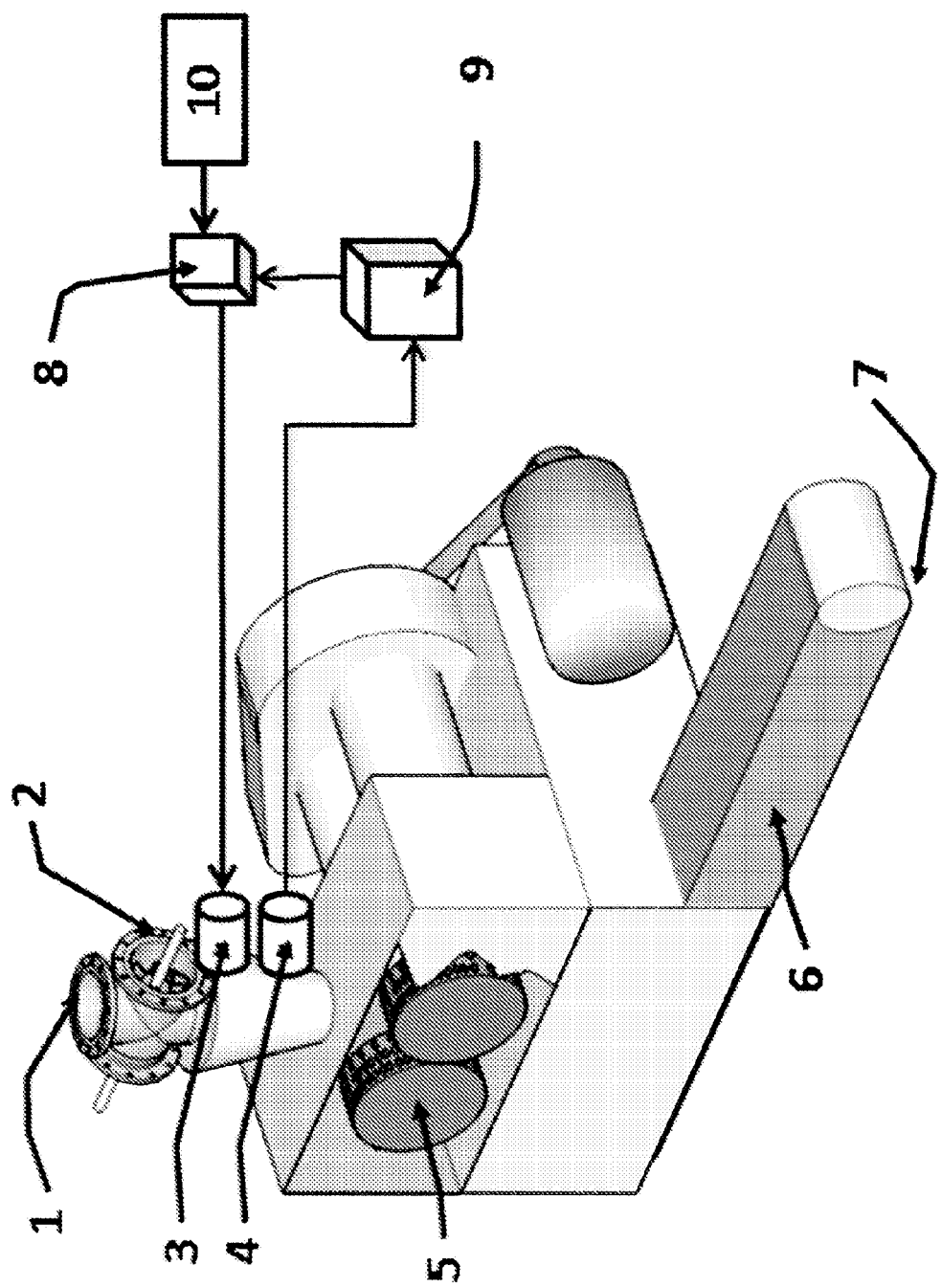
FIG. 14 shows a compaction system.

| The Compactor - FIG. 14 | |
|---|---|
| # | Item |
| 1 | Inlet of biocoal |
| 2 | Rotary valves |
| 3 | Gas injection device |
| 4 | Oxygen sensor |
| 5 | Compaction device (two rollers for example) |
| 6 | Cooler of biocoal |
| 7 | Outlet of biocoal |
| 8 | Active device (pneumatic or electric valve) |
| 9 | Control device (PLC) |
| 10 | Source (tank, vessel, plant, furnace) of inert gas (N2, CO2, flue gas) |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for producing a torrefied biomass that at least partially replaces coal in coal-fired processes, the system comprising one or more connected stages, wherein the one or more connected stages is selected from the group consisting of:
I) a feed bin for receiving, buffering and controlling flow of carbonaceous mineral-bearing feedstock and for, conveying modified feedstock uniformly and smoothly;
II) a dryer associated with the feed bin, the dryer desiccating the modified feedstock at least partially anaerobically to produce dried feedstock, the dryer including a heater that warms the dried feedstock to produce heated, dry feedstock;
III) a torrefaction subassembly for treating the heated, dry feedstock to produce a biocoal having an average size of particles; wherein the torrefaction subassembly includes:
a chamber;
a paddle conveyor mounted within the chamber being provided with bulges extending from the shaft to promote heat transfer;
a control system associated with the chamber for monitoring and influencing feedstock actual moisture content to ensure that actual moisture content is below a desired moisture content, the control system having a moisture sensor;
a motor that adjusts feedstock throughput rate by changing the rotational speed and translational speed of the paddle conveyor to achieve the desired moisture content; and
a mass control device to ensure mass loss occurs within an acceptable range, wherein the mass control device lies in communication with an upstream and a downstream mass meter, the upstream and downstream mass meters measuring mass before feedstock enters the torrefaction subassembly and after it leaves the subassembly, the mass control device adjusting feedstock throughput rate by changing the rotational speed of the paddle conveyor to achieve a desired mass in response to one or more signals from the upstream and downstream mass sensors, thereby controlling mass loss and producing a biofuel with desired characteristics that include reduced chlorine content when feedstock that contains organic chlorinated compounds is introduced into the system that may otherwise be responsible for hazardous emissions;

IV) a particle downsizing system downstream from the torrefaction subassembly for preparing biocoal of a reduced size of particles with a mineral content, wherein the reduced size is between 30 and 1000 microns;

V) after downsizing, a separator for separating minerals from the reduced size particles with a mineral content to produce a mineral-denuded biocoal; and VI) a compactor for agglomerating the mineral-denuded biocoal, at least one of the feed bin or the dryer having a paddle conveyor within a tube, the paddle conveyor including a shaft with paddles extending therefrom, the paddles receiving and transporting feedstock to be conveyed there through so that the feedstock occupies up to 80 percent of the volume of the tube.

2. The system of claim 1, wherein the feed bin includes a storage tank;
the paddle conveyor being mounted in the storage tank for conveying feedstock, the conveyor collecting the feedstock homogeneously from most or all parts of the storage tank,
gas jet devices mounted in the tank for breaking bridges in the feedstock;
a density sensor that senses the density of the feedstock; and
a control system in communication with the density sensor that operates the gas jet devices, thereby producing feedstock that flows more readily, the gas jet devices being activated in response to a density condition in the storage tank that exceeds a desired density condition.

3. The system of claim 1, wherein the dryer includes:
an upstream airlock valve connected to the feed bin;
a reactor with an inner tube and an outer jacket with a source of external heating and protuberances extending from the outside of the inner tube to promote heat exchange, the source of external heating providing a flow of hot fluid within a space between the inner tube and the outer jacket in a direction that opposes a direction of feedstock flow;
the rotary paddle conveyor being supported in the inner tube that carries the feedstock and exerting a translational and centrifugal force thereupon, thus promoting heat transfer to the feedstock from the source of external heating;
a number (N) of oxygen sensors mounted within the reactor, where 0<N<1000;
a first controller in communication with an oxygen sensor, the first controller operating a valve that admits an inert gas into the reactor;
a downstream airlock;
a moisture sensor that measures moisture content of feedstock entering the dryer and at the downstream airlock; and
a second controller in communication with the moisture sensor, the second controller adjusting the feedstock moisture content emerging at the outlet of the dryer by changing the speed and duration of rotation of the rotary paddle conveyor to produce heated, dry feedstock wherein the first and second controllers may optionally be embodied in a single control unit.

4. The system of claim 1, wherein the torrefaction subassembly further includes:
a scrubbing system that at least partially cleans acids that are released from the torrefaction subassembly and creates an effluent that can be re-circulated.

5. The system of claim 4, wherein the torrefaction subassembly additionally includes:
one or more heaters; and
a recirculation system of heated gases to enhance heating efficiency.

6. A torrefaction system including
an upstream airlock;
a fast heater leading from the upstream airlock;
a slow heater downstream from the fast heater;
a torrefaction reactor in communication with the slow heater;
a feedstock;
a paddle conveyor within the reactor, the conveyor moving the feedstock anaerobically through the reactor to emerge as biocoal, the paddle conveyor including a shaft with paddles extending therefrom, the paddles receiving and transporting the feedstock to be conveyed there through, the paddle conveyor also including bulges extending from the shaft to promote heat transfer;
a mass measuring system within the reactor;
a control device that receives signals from the mass measuring system and sends signals to the conveyor so as to influence mass loss from the feedstock by changing rotational and thus translational speed and residence time of the feedstock; and
a downstream airlock.

7. The torrefaction system of claim 6 wherein the feedstock is a biomass and wherein the torrefaction reactor is filled with the biomass up to 95% of the volume of the reactor.

8. A torrefaction system including
an upstream airlock;
an adiabatic torrefaction reactor with a vertically placed moving bed having a paddle conveyor with a shaft and paddles extending therefrom;
a feedstock;
a mass measuring system within the torrefaction reactor;
a control device that receives signals from the mass measuring system and sends signals to the conveyer so as to influence mass loss from a feedstock by changing rotational and thus translational speed and residence time of the feedstock; and
a downstream airlock.

9. The torrefaction system of claim 8 wherein the feedstock is a biomass and, wherein the reactor is filled by the biomass up to 100% of the volume of the reactor.

10. The system of claim 1, wherein the particle downsizing system includes a sealed enclosure with a cooler and grinder to cool and grind the feedstock to a temperature and size required by the compactor and keep oxygen below a certain level to prevent fire:
a sensor to measure oxygen content;
an injector for injecting inert gas into the enclosure to replace oxygen in order to prevent fires and ensure a controlled process; and
a control system to receive a signal indicative of oxygen content from the sensor and operate the injector in response thereto.

11. The system of claim 1, wherein the separator is selected from the group consisting of means for flotation, coal washing, gravity separation, and interfacial flocculation separation.

12. The system of claim 1, wherein the compactor includes two rollers that produce binderless compacted hydrophobic biocoal with a density of 1200-1400 kg/m3 plus high durability and strength,
  wherein the compactor produces binderless compacted hydrophobic biocoal by applying pressure between 2000 and 4000 bar to biocoal particles for a compaction time of between 1 and 30 seconds, and
  wherein the biocoal particles being compacted have a temperature between 150 and 250 degrees Celsius.

13. A manufacturing apparatus for producing a torrefied biomass that at least partially replaces coal in coal-fired processes, the apparatus comprising
  a feeder for receiving carbonaceous mineral-bearing feedstock,
  a dryer that desiccates the feedstock at least partially anaerobically to produce dried feedstock, the dryer including a heater that warms the feedstock to produce heated, dry feedstock; and
  a torrefaction subassembly for treating the heated, dry feedstock to produce a biocoal having an average particle size between 30 and 1000 microns, the torrefaction subassembly having
    a paddle conveyor located within the torrefaction subassembly for conveying the feedstock uniformly and smoothly, the conveyor imparting a centrifugal and translational force to the feedstock, the paddle conveyor having paddles that extend from a shaft and bulges that promote heat transfer;
    a mass measuring system within the torrefaction subassembly,
    a control device that receives signals from the mass measuring system and sends signals to the conveyer so as to influence mass loss from the feedstock by changing rotational and thus translational speed and residence time of the feedstock
    a fast heater that heats the heated, dry feedstock to a temperature of or about 200 degree Celsius;
    a slow heater, downstream from the fast heater, that further heats the heated, dry feedstock to a temperature of between 280 and 320 degrees Celsius; and
    a reactor that is filled to 95% of its volume.

14. The apparatus of claim 13, further including
a particle downsizing system for preparing biocoal of a reduced size of particles following generation of biocoal in the torrefaction assembly.

15. The apparatus of claim 14, further including
a separator for separating minerals from the reduced particles to produce a mineral-denuded biocoal.

16. The apparatus of claim 15, further including
a compactor for agglomerating the mineral-denuded biocoal that applies pressure between 2000 and 4000 bar to biocoal particles for a compaction time of between 1 and 30 seconds,
  wherein the biocoal particles being compacted have a size between 30 and 1000 microns and have a temperature between 150 and 250 degrees Celsius.

17. A process for producing a torrefied biomass that at least partially replaces coal in coal-fired processes, the process comprising the steps of:
  I) ingesting carbonaceous mineral-bearing feedstock into a feed bin for receiving, buffering and for conveying modified feedstock uniformly and smoothly;
  II) drying the modified feedstock at least partially anaerobically to produce dried feedstock, the dryer including a heater that warms the dried feedstock to produce heated, dry feedstock;
  III) torrefying the heated, dry feedstock to in a torrefaction reactor produce a biocoal having an average size of particles;
  IV) controlling the residence time of the feedstock in the reactor in response to upstream and downstream mass measurements to ensure that mass loss from the feedstock occurs within an acceptable range;
  V) downsizing the particles to prepare biocoal with a reduced size of particles of between 30 and 1000 microns and a mineral content;
  VI) separating minerals from the reduced particles with a mineral content to produce a mineral-denuded biocoal; and
  VII) compacting the mineral-denuded biocoal by applying pressure between 2000 and 4000 bar to biocoal particles for a compaction time of between 1 and 30 seconds, wherein the biocoal particles being compacted have a temperature between 150 and 250 degrees Celsius,
at least some of steps I)-VII) including conveying the feedstock by a paddle conveyor with paddles mounted on a shaft within a tube so that the feedstock fills up to 80 percent of a surrounding vessel.

* * * * *

UNITED STATES PATENT AND TRADEMARK OFFICE
CERTIFICATE OF CORRECTION

PATENT NO.        : 9,193,916 B2  
APPLICATION NO.   : 13/594235  
DATED             : November 24, 2015  
INVENTOR(S)       : Ezra Bar-Ziv et al.

Page 1 of 1

It is certified that error appears in the above-identified patent and that said Letters Patent is hereby corrected as shown below:

In the Claims

Column 18, Line 23, Claim 17:

After "dry feedstock"  
Delete "to in a torrefaction reactor" and  
Insert -- in a torrefaction reactor to --.

Signed and Sealed this  
Eighth Day of March, 2016

Michelle K. Lee  
*Director of the United States Patent and Trademark Office*